(No Model.)
F. W. BARKHAUS, Jr.
APPARATUS FOR DISTRIBUTING WATER FOR IRRIGATION.
No. 494,455. Patented Mar. 28, 1893.
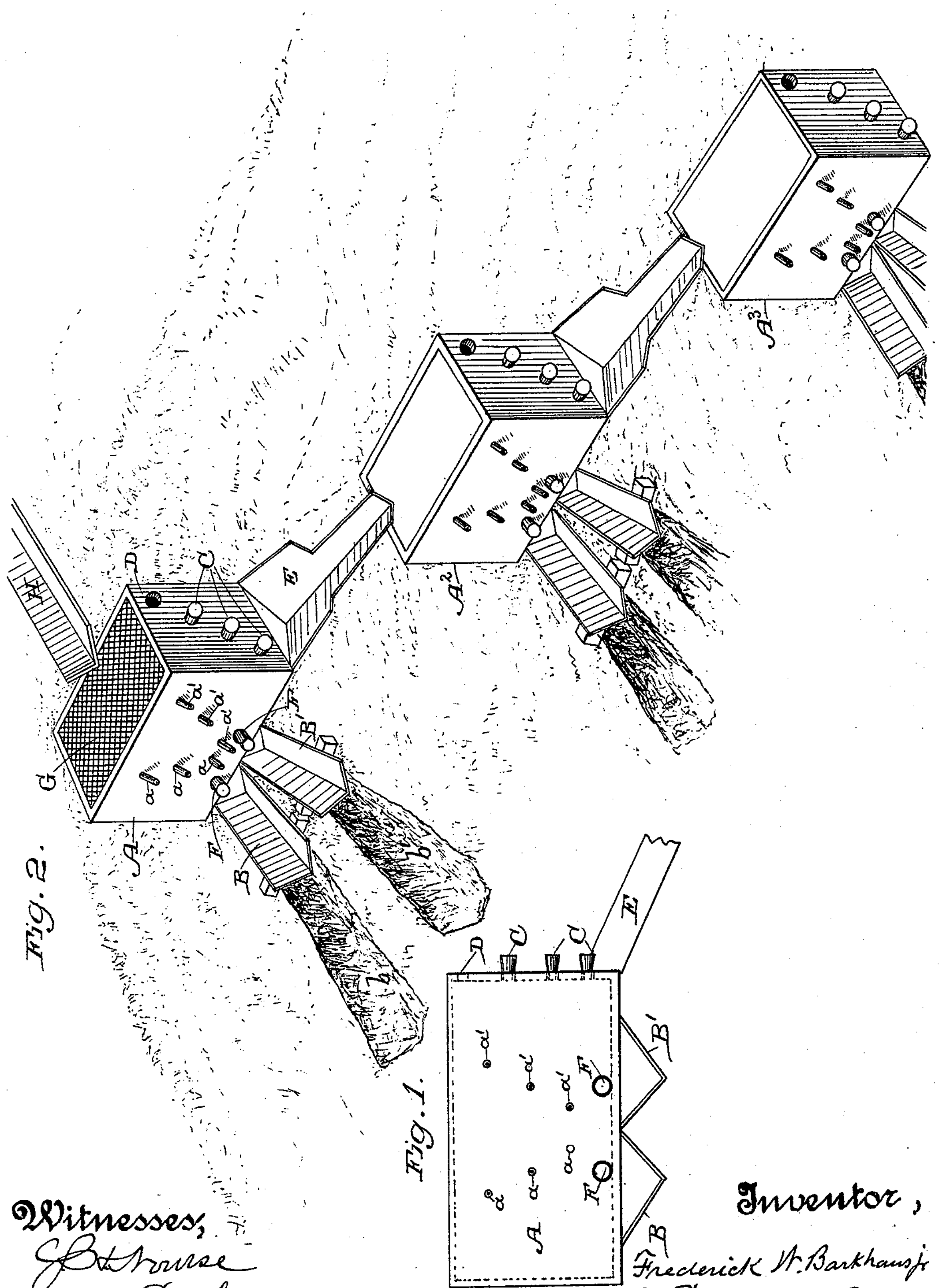
Witnesses;
Inventor,
Frederick W. Barkhaus Jr
By Dewey & Co. attys.
THE NORRIS PETERS CO., PHOTO-LITHO., WASHINGTON, D. C.

UNITED STATES PATENT OFFICE.

FREDERICK W. BARKHAUS, JR., OF WRIGHT'S, CALIFORNIA.

APPARATUS FOR DISTRIBUTING WATER FOR IRRIGATION.

SPECIFICATION forming part of Letters Patent No. 494,455, dated March 28, 1893.

Application filed December 3, 1892. Serial No. 453,985. (No model.)

*To all whom it may concern:*

Be it known that I, FREDERICK W. BARKHAUS, Jr., a citizen of the United States, residing at Wright's, Santa Clara county, State of California, have invented an Improvement in Apparatus for Distributing Water for Irrigation; and I hereby declare the following to be a full, clear, and exact description of the same.

My invention relates to the class of irrigating apparatus.

It consists in a series of communicating tanks having each a vertical series of corresponding outlets, each series being adapted to discharge into its own channel, and a vertical series of separately controllable discharges for the communications of the tanks, so located with respect to the outlets as to distribute the water from each tank through the equivalent outlets in the vertical series of each.

The object of my invention is to provide an apparatus for irrigating purposes in which the water may be equally distributed throughout a given area, and its distribution regulated and adjusted to the amount of initial supply. It is applicable in all situations, but is especially adapted for use on side hills.

Referring to the accompanying drawings for a more complete explanation of my invention,—Figure 1 is a front elevation of one of my tanks. Fig. 2 is a perspective view, showing them in series.

A is a tank. In its front are outlets *a* in any suitable shape, here shown as plain spouts. These outlets are situated in different horizontal planes constituting a vertical series. I have here shown three outlets in the series, though their number may be more or less. They may be directly above one another, but it is preferable to locate them in different vertical planes to avoid splashing by interference. All the outlets *a* of the series are intended to discharge into the same channel, and to illustrate this, I have shown a short trough B below, adapted to receive the discharge of each of said outlets, and to conduct the water into a specified channel such as *b*. There may be more than one series of outlets *a* in the tank. I have here shown a second series *a'* arranged precisely the same as the series *a*, the equivalent outlets of the two series being in the same horizontal plane, and this second series discharges into a common trough B' conducting the water into a second channel *b'*.

In the end of tank A are the separately controllable discharges C. These may be of any suitable character. They are here shown as holes fitted with removable plugs. These discharges are in different horizontal planes forming a vertical series, and they are preferably located in different vertical planes, as heretofore described, with regard to the outlets *a* and for the same purpose. The lowermost discharge of the series C is in a horizontal plane below the horizontal plane of the lowermost of the series of outlets *a* and *a'*; and the next discharge is below the plane of the next outlet and so on; while near the top of the tank is an overflow D. The series of discharges C and the overflow are adapted to deliver the water into a common flume E which extends to and is in communication with the top of a second tank, precisely similar in the arrangement and position of its outlets and discharges to the tank A, and here designated by $A^2$, and said tank $A^2$ is connected in like manner with a similar third tank such as $A^3$, and so on indefinitely throughout as large a series as the exigencies of the case demand.

F are plug-controlled drain apertures under the lowermost outlets of the several vertical series.

G is a screen, which may be placed in the top of the first tank A and in the others if desired.

H is the supply flume communicating with the first tank A of the series. These tanks are to be located at required distances apart and at suitable relative elevations to provide for their communication. Their outlets communicate with the several channels or ditches in the area to be irrigated.

The operation is as follows:—When there is the maximum amount of inflowing water through flume H, all the discharges C are kept closed. The water will first fill up tank A, being in excess of the capacity of its outlets, and will then overflow through D, and pass through flume E into tank $A^2$. It will likewise fill this tank and then overflow to and fill tank $A^3$ and so on throughout the series.

All the tanks will then be running at their full capacity, and will be discharging an equal amount of water into the several ditches. But when the amount of inflowing water is diminished or it be deemed not desirable to distribute so much, or unnecessary so to do, the uppermost of the vertical series of discharges C of each tank is opened by removing its plug. The water in tank A will now, of course, rise only to the level of this discharge, before passing off to the next tank, in which it will rise to an equivalent level and then flow to the third tank, and so on. And as the level of this discharge is below that of the uppermost of the outlet series $a$ and $a'$ in each tank, these outlets are not reached by the water, which thus discharges from all the tanks only from the outlets below the uppermost. Thus the amount discharged is diminished to suit the necessities of the case, whether of the needs of the ground, or of the initial supply, but still the water is equally distributed and supplied. Following this operation to a further reduction of the amount of water distributed, the second plugs C are withdrawn, whereby water is supplied only from the lowermost of the outlet series of each tank. If there be but a small amount of water, perhaps insufficient to be distributed simultaneously to all the tanks, the removal of the lowermost plugs C of successive tanks will cause all the water to pass to the next tank until the one is reached which will act as the first tank of a series for that amount of water, and then when the discharge from such limited series is completed the limits of the series may be gradually advanced from tank to tank by shutting off the lower discharges of successive tanks; or each tank may be used successively to supply its ditches. By removing plugs F, the apertures of which are made large, any tank may be caused to discharge all the water directly into its ditches.

Having thus described my invention, what I claim as new, and desire to secure by Letters Patent, is—

1. An irrigating apparatus consisting of a series of communicating tanks, a vertical series of corresponding outlets in each tank, each series being adapted to discharge into its own channel or ditch, and a vertical series of separately controllable discharges in each tank adapted to deliver the water into the communication with the succeeding tank, and so located with respect to the outlets of the tanks that each discharge of a series shall be below the horizontal plane of a corresponding outlet in its own tank, substantially as herein described.

2. An irrigating apparatus consisting of the series of tanks, each having the corresponding vertical series of outlets, and the corresponding vertical series of separately controllable discharges on relatively lower planes than the outlets, the troughs into which the outlet series discharge the flumes connecting the tanks and into which the series of discharges deliver their water, and the supply flume communicating with the first tank of the series, substantially as herein described.

In witness whereof I have hereunto set my hand.

FREDERICK W. BARKHAUS, JR.

Witnesses:
S. H. NOURSE,
J. A. BAYLESS.